Sept. 27, 1955 G. A. ROBERTS ET AL 2,719,284
TELEMETRIC SYSTEMS AND APPARATUS
Filed Oct. 11, 1950 3 Sheets-Sheet 3
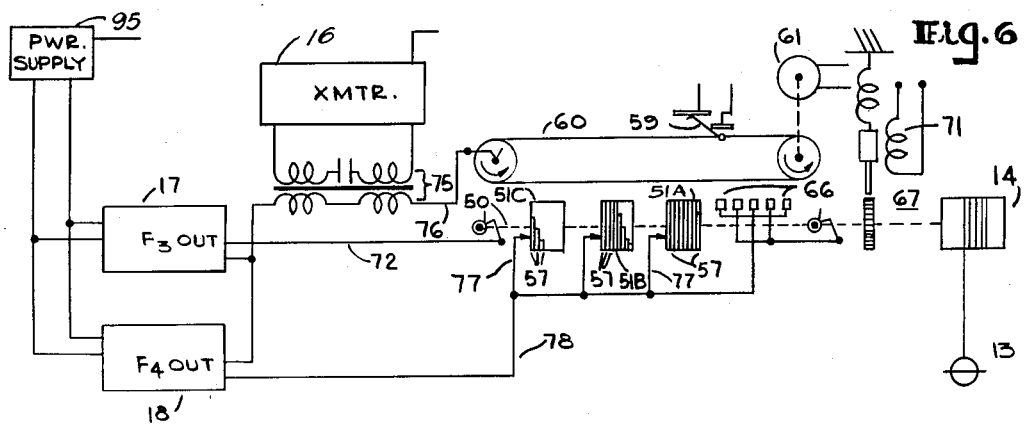
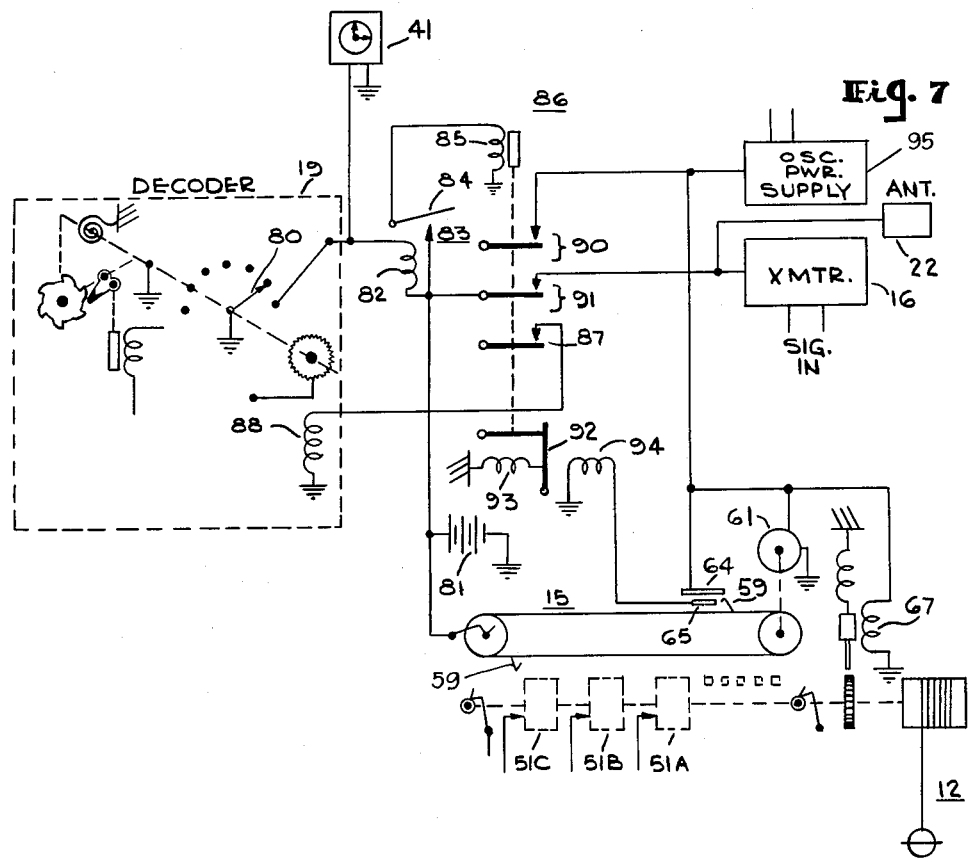
INVENTORS
GEORGE A. ROBERTS
CHARLES D. GROSSER
MARTIN V. KIEBERT JR
BY
Woodcock and Phelan
ATTORNEYS

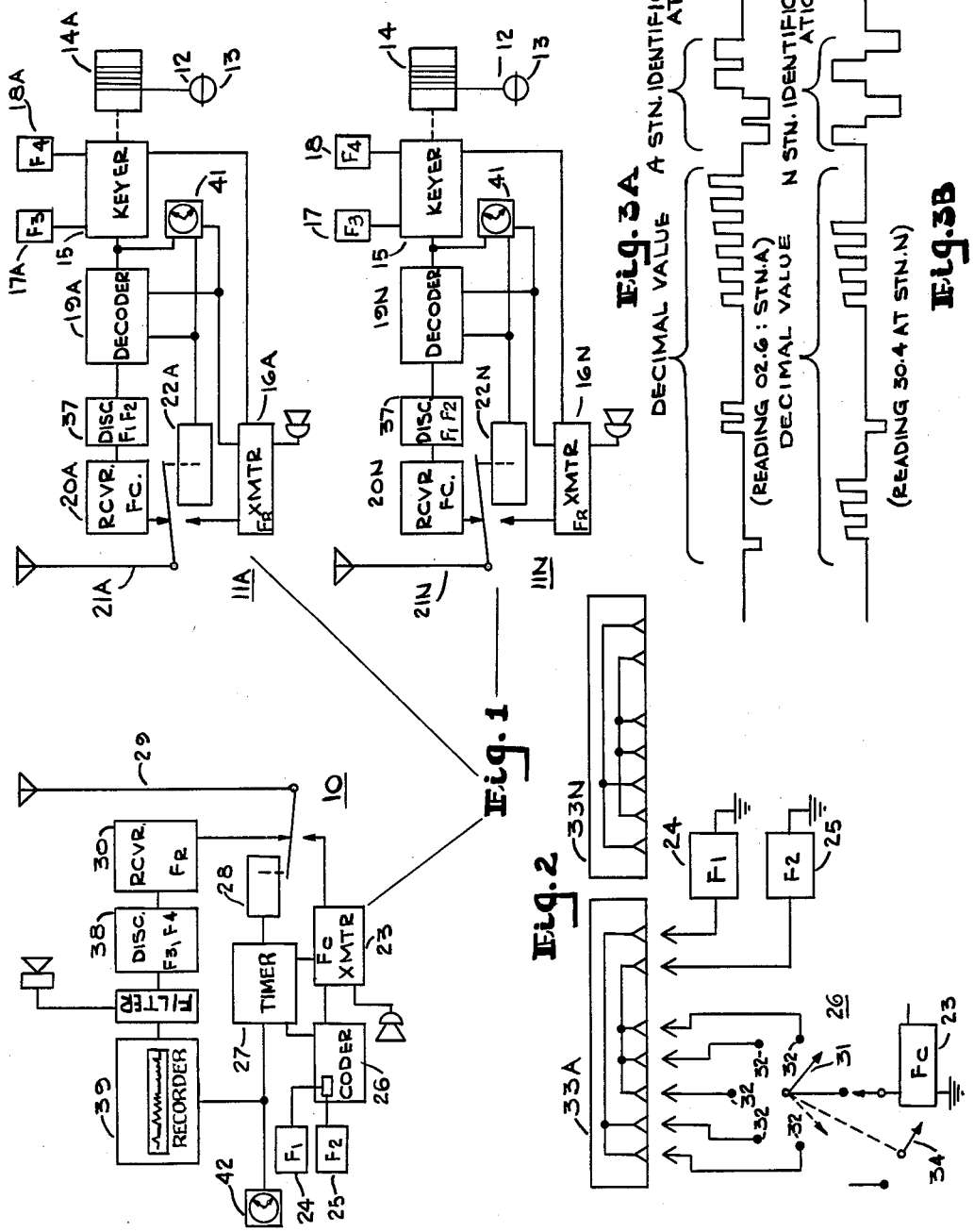
Sept. 27, 1955    G. A. ROBERTS ET AL    2,719,284
TELEMETRIC SYSTEMS AND APPARATUS
Filed Oct. 11, 1950    3 Sheets-Sheet 1
INVENTORS
GEORGE A. ROBERTS
CHARLES D. GROSSER
MARTIN V. KIEBERT JR.
BY
Woodcock and Phelan
ATTORNEYS

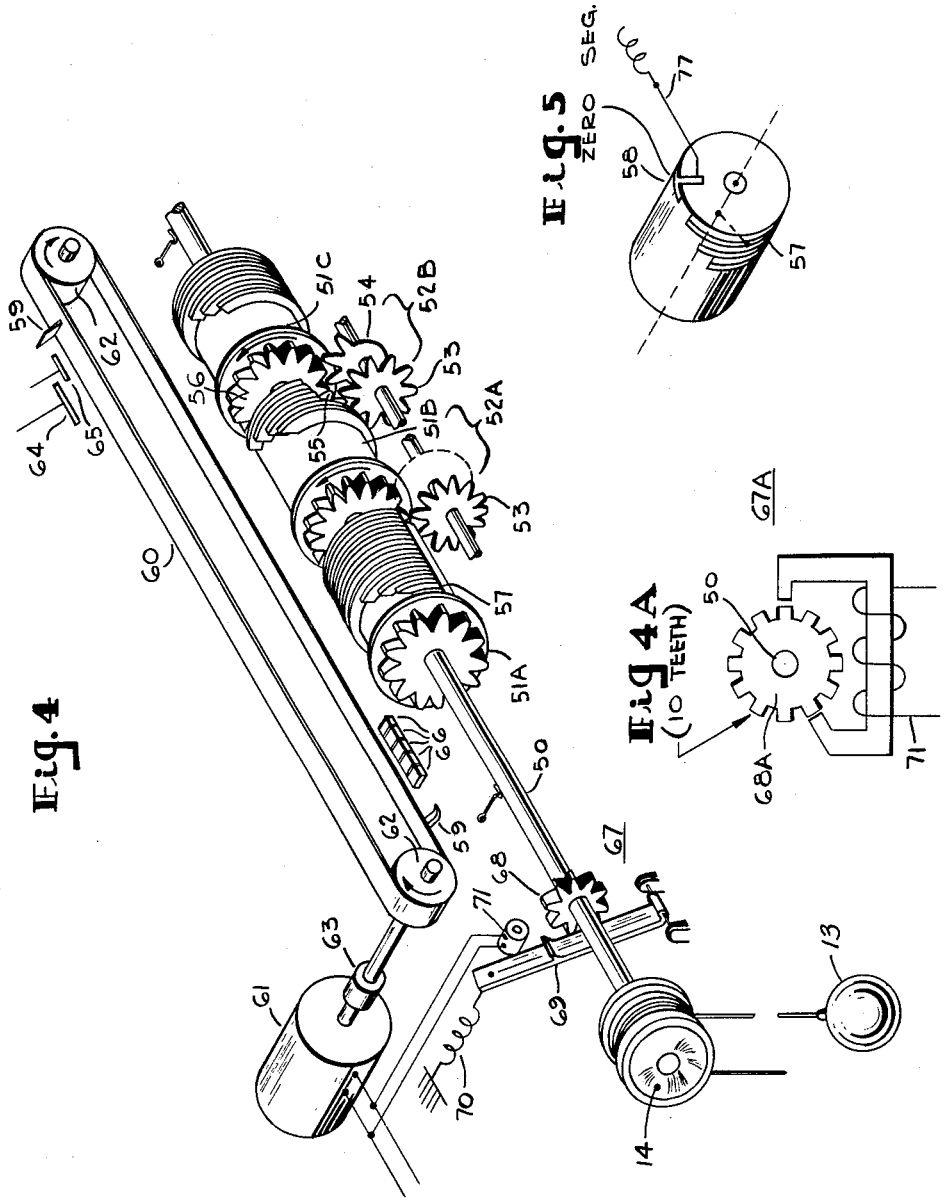

United States Patent Office 2,719,284
Patented Sept. 27, 1955

2,719,284

TELEMETRIC SYSTEMS AND APPARATUS

George A. Roberts, Swarthmore, Pa., Charles D. Grosser, Westville, N. J., and Martin V. Kiebert, Jr., Philadelphia, Pa., assignors to Raymond Rosen Engineering Products, Inc., Philadelphia, Pa., a corporation of Pennsylvania Application October 11, 1950, Serial No. 189,581

18 Claims. (Cl. 340—151)

This invention relates to telemetric systems, and particularly to telemetric systems of type comprising remote reporting stations provided with measuring equipment, responsive for example to changes in river level, whose data is to be recorded or otherwise indicated at a central station.

In accordance with the present invention, the reporting stations are on "standby" in readiness to transmit measuring information upon call from the central station. When it is desired to receive measuring information from a particular reporting station, the coded call of that station is transmitted by radio or wire link from the central station. Receivers at all reporting stations receive the call, but selective decoders of the reporting station preclude reply from all except the one called, the decoder of the called station initiating a cycle during which its measuring information is transmitted to the central station, preferably together with a signal identifying the reporting station. Upon completion of the cycle, the reporting station equipment returns to standby in readiness for the next call.

More particularly, each reporting station includes a decimal keyer which translates the response of a measuring instrument into a series of pulses corresponding in group sequence and number with the decimal numerical value of the measured condition: more particularly, the zeros of any particular numerical value are identified by pulses characteristically different from the pulses for integers. More specifically, the decimal keyer comprises rotatable contact-supporting members which are interconnected by counter mechanisms and coupled for angular positioning by the measuring instrument; during a cycle initiated by the selective decorder of the reporting station, a counting contact of the keyer traverses zero and integer contacts of the rotatable members to produce the information pulses corresponding with the decimal value of the measured variable. Preferably, the counting contact during the keyer cycle also traverses a fixed group of contacts arranged to provide a pulse group identifying the reporting station.

Further in accordance with the invention, the decimal keyer is provided with means, preferably a brake, effective during movement of the counting contact temporarily to preclude change in setting by the measuring device of the decimal contacts of the keyer.

Further in accordance with the invention, the counting contact, or one moving in unison therewith, is effective near the end of the keyer cycle to deenergize a latching relay controlled by the decorder in initiation of the cycle and to maintain drive of the counting contact for a brief interval after such relay deenergization, so to insure the decimal keyer is in condition to report when the station is again called.

The invention further resides in telemetric systems and apparatus having features of novelty and utility hereinafter described and claimed.

For a more detailed understanding of the invention and for illustration of systems and apparatus embodying it, reference is made to the accompanying drawings in which:

Fig. 1 is a block diagram showing the central and reporting stations of a telemetric recording system;

Fig. 2 in simplified form illustrates a selective calling coder of the central station of Fig. 1;

Figs. 3A and 3B are telemetering records produced by the central station recorder of Fig. 1;

Fig. 4 is a perspective view of a preferred form of decimal keyer for reporting stations of Fig. 1;

Fig. 4A is a modification of brake mechanism shown in Fig. 4;

Fig. 5 is a perspective view of one of the decimal contact drums of Fig. 4;

Fig. 6 schematically illustrates the decimal keyer of Fig. 4 and associated transmitter-modulating circuits; and Fig. 7 schematically illustrates the decimal keyer of Fig. 4 and associated components initiating and terminating its cycle.

Referring to Fig. 1, there is shown a central station 10 at which is to be recorded or indicated the telemetric information from remote reporting stations exemplified by stations 11A—11N. At each of the reporting stations, there is a measuring instrument 12 responsive to the variations of a condition to be measured, for example, liquid level, wind velocity, pressure, or the like. For purpose of explanation, it may be assumed that instruments 12 are for measuring liquid level and that the reporting stations are spaced along a river or stream. For such purpose, the changes in vertical position of each float 13 are converted to angular positions of a pulley or drum 14 suitably coupled to the decimal keyer 15 of the corresponding reporting station.

As hereinafter more specifically described, the response of the measuring instrument is translated by the keyer into a series of pulses, corresponding with the existing magnitude of the measured variable, which are utilized to modulate the carrier-frequency of the transmitter (16A—16N) of the corresponding reporting station (11A—11N). The carrier frequency $F_R$ of all reporting stations is the same to permit use of a single receiver and recorder arrangement at the central station.

Preferably, the modulation for the transmitter 16 of each reporting station is of one frequency $F_3$ for zeros of the decimal places of the numerical value of the measured condition and is of another frequency $F_4$ for integer values of the decimal places. To that end, there is associated with each keyer a pair of tone-generators 17, 18, or equivalent, whose outputs, under control of the keyer, are selectively applied to modulate the transmitter. The decimal keyer of each station (11A—11N) is controlled by a selective decoder (19A—19N) which initiates a cycle of the keyer when that station receives a call from the central station 10.

Normally, all reporting stations are on "standby" with their respective receivers 20A—20N connected to corresponding antennas or transmission lines 21A—21N through suitable receive-transmit relays 22A—22N. The transmitter 23 at the central station 10 is tuned to the frequency $F_C$ to which the receivers of all reporting stations are tuned. The transmitter frequency $F_C$ of the central station may be the same as or different from the transmitter frequency $F_R$ of the reporting stations.

To call a particular reporting station, the carrier frequency of the central station transmitter 23 is modulated in a code sequence to which the decoder (19A—19N) of that particular reporting station selectively responds to initiate a cycle of the associated keyer. Preferably, there are utilized two or more modulating frequencies such as provided for example by tone-generators 24 and 25. A coder 26 interposed between the transmitter 23 and the tone-generators 24, 25 provides, upon actuation of the coder by an operator, for transmission from the central station of a sequence of tone-modulation pulses corresponding with the particular reporting station called.

Any of various known types of selective calling coders may be used in the system of Fig. 1; for clarity of understanding, a greatly simplified form of coder is shown in Fig. 2. When the coder contact 31 is moved counter-clockwise, as by an operator, from the full-line "standby" position to the dotted line "calling" position, it successively engages a series of fixed contacts 32 which are connected in prechosen sequence through a code block 33 to the tone-generators 24—25. For the particular code block 33A shown in position for calling of station 11A, the calling sequence is three pulses of frequency $F_2$ followed by two pulses of frequency $F_1$. With code block 33N in place for calling of station 11N, the code sequence is two pulses of frequency $F_2$, a pulse of frequency $F_1$, a pulse of frequency $F_2$ and a pulse of frequency $F_1$ in the sequence named. The number of different code blocks used for selective calling corresponds in number with the reporting stations.

The coder 26 may also include a contact 34 movable with contact 31 and effective when the coder has completed a call to shift the antenna relay 28 of the central station from transmit to receive position. Specifically, the control of relay 28 of Fig. 1 to shift the antenna or transmission line 29 from connection to the transmitter 23 to the receiver 30 may be effected through a suitable timer 27 which also energizes the chart-feed motor of a recorder 39 for a suitable interval. The central station after calling a particular reporting station is thus in condition to receive the information transmitted from that station for recording by the recorder 39, and, at the end of the interval afforded by timer 27, reverts to its original standby condition in readiness for calling for a report from the same or any other reporting station.

Each of the reporting station receivers is provided or associated with a discriminator 37 such as used in radio receivers for reception of frequency-modulated broadcast programs. The null output frequency of each of the discriminators 37 is intermediate the frequencies $F_1$—$F_2$ of the tone-generators 24, 25 at the central station. Thus, a calling tone sequence from the central station is converted at all reporting stations to a sequence of direct-current pulses of number and polarity corresponding with the code block used at the central station in calling of a particular reporting station. Assuming, for example, that station 11A has been called, only its selective decoder 19A is stepped by such positive and negative pulses to that position which initiates a cycle of its keyer 15, energization of its transmitter 16A and shift of its relay 22A from standby to transmit. Assuming for example the position of the float 13 at called station 11A corresponds with a measurement of 02.6 feet, the keyer during its cycle modulates the transmitter in a tone sequence of one pulse of frequency $F_3$, two pulses of frequency $F_4$ and six pulses of frequency $F_4$. The discriminator 38 at the central station has a null output frequency intermediate the frequencies $F_3$ and $F_4$ so that the series of received information pulses as impressed upon the recorder 39 at the central station are of different polarities for the zero and integer values of the measured variable, the record trace for the transmitted reading appearing as shown in Fig. 3A.

Preferably, the keyer 15 of the called or reporting station 11A, either before or after transmission of the numerical value of the measured value, also transmits a series of coded pulses for inclusion in the recorded trace as a reporting-station identification. Specifically, during its cycle, the keyer 15 of station 11A may provide two pulses of frequency $F_3$ followed by two pulses of frequency $F_4$ which, as recorded at the central station, appear as the station-identification group shown in the right-hand portion of Fig. 3A.

With code block 33N in place at the transmitting station, the tone sequence code transmitted is recognized only by the selective decoder 19N of station 11N, all other reporting stations remaining in standby condition. In such case the keyer 15 of station 11N begins its cycle, its transmitter 16 is energized, and its relay 22N shifts from standby to transmit. Assuming its float 13 is in position corresponding with 30.4 feet, the series of information pulses as applied to the transmitter 16 consists of three pulses of frequency $F_4$, a single pulse of frequency $F_3$ and four pulses of frequency $F_4$. This series of pulses is transformed by the receiver 30 and discriminator 38 at the central station to a corresponding series of positive and negative pulses which as appearing on the chart of recorder 39 appear as in the left-hand portion of Fig. 3B.

During the cycle of the keyer 15, but before or after the series of data pulses, the tone-generators 17, 18 of station 11N are connected in sequence affording the tone pulses $F_4$, $F_3$, $F_4$, $F_3$. These tone pulses are converted to pulses of opposite polarity and appear on the chart of recorder 39 as the station-identification trace appearing in the right-hand portion of Fig. 3B.

The system described affords great flexibility of operation: an operator at the central station may repeatedly call for telemetric information from any reporting station as often as circumstances demand, or he may call any group of them in any desired order, variable at will to follow, for example, the progress of flood conditions along a river and its tributaries.

Instead of the two-tone calling arrangement above described, there may be and has been used the single-tone coder and selective decoder arrangement described by J. K. Kulansky in the December 1949 and January 1950 issue of FM-TV and Radio Communication Magazine published by the "Publishing House," Great Barrington, Massachusetts. The title of the aforesaid magazine has recently been changed to "Communication Engineering." In brief, the calling pulse sequence for any particular reporting station 11A—11N may be selected by dial or push-button control of a stepping switch at the central station.

With such arrangement, as with the two-tone arrangement above described, any reporting station of the telemetric system can be called at any time, the selective decoders at the reporting stations precluding operation of all decimal keyers except the one at the station called. For brevity here, the single-tone calling arrangement is not here more specifically described but is included by reference to the aforesaid Kulansky article. Fig. 1 is generically exemplary of both arrangements.

Preferably, and as above described, frequency or phase modulation, rather than amplitude-modulation, of the transmitter is used both for calling and for transmission of telemetric information to insure that during heavy atmospherics or other "noise" a calling signal as received by the decoders will be free of alteration by noise which otherwise could cause the wrong station to report and to insure that the telemetric signal as received by the recorder will be free of noise pulses which otherwise could result in an erroneous reading at the central station.

Voice communication between the central and reporting stations may be afforded without duplication of receiving and transmitting equipment by providing the stations with microphones and head sets or speakers shown by conventional symbol. The transmission of voice and telemetric signals may be effected simultaneously and without interference by use of a filter between the discriminator 38 and the amplifier channels respectively including the recorder 39 and the central station speaker, or equivalent.

A preferred form of decimal keyer for the reporting stations of Fig. 1 is shown in Fig. 4. The shaft 50 positioned by the float 13, or other measuring device, is directly coupled to the first of a series of contact-supporting members 51A et seq., the number of contact members corresponding with the decimal places to which the instrument readings are to be recorded. In the particular arrangement shown, the three members 51A–51C are concentrically mounted drums interconnected by decimal counter mechanisms 52A, 52B, each comprising a gear 53 and a mutilated gear 54. The gear 53 of each counter train continuously engages the gear 55 of one contact drum and the mutilated gear 54 of the same train engages the gear 56 of the next drum once every ten revolutions of the former. The drums 51B and 51C are free to rotate with respect to shaft 50 but are constrained from movement axially thereof by bearing blocks, not shown.

By virtue of the interconnecting counter mechanisms, for each revolution of contact drum 51A, the next drum 51B is stepped one-tenth of a revolution; and for each revolution of drum 51B, the next drum 51C is stepped one-tenth of a revolution. Each of the drums is provided with nine peripheral contacts 57 corresponding with the integers 1 to 9, the angular extent of the contacts varying inversely with their integer value. These integer contacts 57 are electrically connected to each other and to the shaft 50 of the decimal keyer. Each drum is also provided with a zero contact 58 for engagement by a contact brush 77, Fig. 5.

The axis of rotation of the contact drums 51A et seq. is parallel to the path of movement of a counting contact 59 attached to and extending from an endless loop or band 60 of flexible metal. The counting contact 59 is driven from an electric motor 61 connected to one of the pulleys 62 through an insulating coupling 63. As the counting contact 59 moves through its cycle, it engages one or more of the contacts of each of the drums in dependence upon the numerical value of the corresponding decimal place of the measured variable. If the angular position of a particular drum corresponds with any of the integers 1 to 9, the counting contact successively engages a corresponding number of contacts 57 of the drum: if the numerical value of a decimal place is zero, the counting contact 59 engages the zero contact 58 of the corresponding drum.

To shorten the idle time in a cycle of the decimal keyer, there may be provided, as shown in Fig. 4, two counting contacts 59 equally spaced along the periphery of the endless loop 60. Thus, as hereinafter appears, a keyer cycle ends when a counting contact passes slightly beyond the control contacts 64—65 and the next cycle ends when the other counting contact arrives at that position.

For identification of its reporting station, each keyer is also provided with a group of identification contacts 66 disposed in the path of the counting contacts for engagement thereby, before or after the drum contacts, in a keyer cycle.

To prevent any change in the angular position of the contact drums during a cycle of the keyer, there is provided a brake which is set throughout movement of the counting contact over the drum contacts. Specifically, the brake 67 of Fig. 4 may comprise a brake drum or wheel 68 attached to shaft 50 of the keyer and a brake shoe 69 biased to released position by a spring 70. An electromagnet 71 energized concurrently with the keyer motor 61 effects setting of the brake for each reporting interval of the keyer. In another form, Fig. 4A, the brake (67A) may comprise a toothed armature 68A attached to shaft 50 and disposed in the field of the brake electromagnet 71.

The circuit connections of the keyer of Fig. 4 for effecting modulation of the reporting station transmitter in accordance with the measured variable and the preselected station identification is shown in Fig. 6. When during the keyer cycle the counting contact 59 engages any of the integer contacts 57 of the contact drums 51A et seq., the output circuit of tone-generator 17 is completed through shaft 50, conductor 72, the output impedance of the tone-generator, modulation transformer 75, conductor 76, and the contact-supporting loop 60. When the counting contact engages any of the zero contacts 58 of the contact drums 51A et seq., the output circuit of the other tone-generator 18 is completed through a brush 77, conductor 78, the output impedance of tone-generator 18, modulation transformer 75, conductor 76 and endless loop 60. During the keyer cycle, the counting contact 59 also engages the identification contacts 66, some of which may be connected to the shaft 50 of the keyer and thence to tone-generator 17 and others of which may be connected through conductor 78 to the tone-generator 18. Thus, for each keyer cycle, the counting contact successively engages decimal contacts 57, 58 of the drums to give a series of tone pulse groups corresponding with the numerical value of the decimal places of the measured variable and engages the contacts 66 to give a tone sequence identifying the station.

The circuit connections of the keyer providing for initiation of its cycle when its station is called and for automatically terminating the cycle when the information has been reported, are shown in Fig. 7. The operating positions of components of the keyer and its associated control elements just prior to completion of a call are shown in this figure. When the call for the station is completed, the stepped contact 80 of the selective decoder 19 completes a circuit from battery 81, or equivalent current source, through the coil 82 of a relay 83. The resulting closure of the contact 84 of relay 83 effects energization of the actuating coil 85 of a latch-in relay 86. The closure of contacts 87 of the latch-in relay effects deenergization of the trip coil 88 of the decoder so that contact 80 thereof may immediately return to its original standby position. The closure of contacts 90 of the latch-in relay complete an energizing circuit for the keyer motor 61 and the keyer brake 67 so that the counting contact 59 of the keyer starts its cycle during which the contact drums are precluded from actuation by the measuring instrument 12. The energization of the relay 86 may also, as by contacts 90 and 91, turn on the power supply 95 for the tone-generators 17—18 (Fig. 2) and also the plate power for the transmitter 16, as well as to effect actuation of the transmit-receive relay 22. The contacts of relay 86 are held in closed-circuit position, despite deenergization of the actuating coil 85 resulting from return of decoder contact 80 to its original position, by the latch 92 biased to latching position by spring 93.

As the counting contact 59 approaches the end of its travel for a cycle of the keyer, it engages a control contact 65 to complete a circuit for the release coil 94 of the latch-in relay 86. The latch 92 is withdrawn, permitting the contacts 87, 90 and 91 to return to the open-circuit position shown in Fig. 7.

To ensure that the counting contact moves beyond engagement with the control contact 65 of the release coil, there is provided the second control contact 64 engaged by the counting contact 59 for a further brief interval to continue energization of the motor 61 despite the tripping of the latch-in relay. It is thus insured that the keyer is in condition for reporting when the station is next called. The showing of decoder 19 in Fig. 7 is greatly simplified as for single tone calling. The decoder 19 may be of known type, fully shown, for example, in the Kulansky articles. For two-tone calling, the stepping contact 80, together with its pulse responsive actuator may be duplicated so that one contact is stepped by negative pulses and the other contact is stepped by positive pulses; the concurrent position of the two stepping contacts at the end of the calling sequence determining which reporting station has its relay 83 energized as above described.

When it is desired that the stations report at predetermined times, without call from the central station, the stepping switch 80 of each decoder, may as in Fig. 7, be shunted by a time-controlled or clock-switch 41, of any suitable type. These clock switches may be set for different times of initiation of the reporting cycles of the several reporting stations and a clock switch 42 at the central station is programmed to restart the central station recorder 39 shortly before each of stations 11A—11N is due to report. The momentary closure of contacts in the time switch 41 of a reporting station, effects energization of relay 83 and the reporting cycle proceeds as above discussed in description of Fig. 4.

It shall be understood the invention is not limited to specific details of the particular arrangement described and illustrated, but that changes and modifications may be made within the scope of the appended claims.

What is claimed is:

1. A telemetric system comprising a central station and a plurality of reporting stations, said central station including a carrier-frequency transmitter, a coder for effecting modulation of the carrier of said transmitter in calling-pulse sequences each corresponding with a particular reporting station and selectable to call any reporting station repeatedly or to call any two or more of said stations in any order, a recorder, and a frequency-selective receiver for supplying said recorder with pulse information from a called reporting station; each of said reporting stations including a receiver tuned to the carrier-frequency of said central station transmitter, a decoder actuated by the demodulated output of the receiver and selectively responsive to the calling-pulse sequence for the station, a transmitter having a carrier frequency tuned to the receiver of the central station, and a decimal keyer having a cycle of operation initiated by the decoder and during which it effects modulation of the carrier of the reporting station transmitter to produce a series of information pulses conveying the decimal value of a measured variable.

2. A system as in claim 1 in which the central station includes generator means for producing two different tone frequencies selectively applied by the coder to modulate the carrier of the transmitter whereby the calling-pulse sequences include number and tone permutations; and in which each reporting station has a discriminator included in the output of the receiver and whose null-output frequency is intermediate the tone-generator frequencies to derive pulses in number and polarity corresponding with the number and tone permutations of the calling-pulse sequences.

3. A system as in claim 1 in which each reporting station includes modulating means for producing two different tone frequencies, one of which is applied by said decimal keyer to the station transmitter for zeros of the decimal value of the measured variable, and the other of which is applied for integers thereof; in which the central station has a discriminator in circuit between the receiver and the recorder and whose null-output frequency is intermediate said two different tone frequencies to produce output pulses of different polarity for zero and integer values and in which the record indicates the number and polarity of the pulses for each decimal place of the measured variable.

4. In a telemetric reporting station comprising a decoder responsive to calling signals from a central station and having contact structure moved from standby position to station-reporting position upon occurrence of calling signals assigned to the reporting station; a decimal keyer having decimal contact groups interconnected by counter mechanism and positioned by a condition-measuring device, a counting contact movable in a cycle successively to engage contacts of said groups to produce telemetric information signals for transmission to said central station, and a motor for actuating said counting contact; relay means operable upon movement of said decoder contact structure to said station-reporting position to initiate a cycle of movement of said counting contact by said motor; and a contact member operated upon completion of a cycle of said counting contact to preclude further movement thereof by said motor.

5. Apparatus as in claim 4 in which the relay means includes an actuating coil energized upon movement of the decoder contact structure to said reporting position and a release coil energized through said contact member upon completion of the counting contact cycle.

6. Apparatus as in claim 5 including means responsive to energization of the relay means for releasing the decoder contact structure for return from its reporting position to its standby position.

7. Apparatus as in claim 4 additionally including a brake controlled by said relay means to preclude movement of said contact groups by said measuring device during a cycle of movement of said counting contact.

8. Apparatus as in claim 4 in which each contact group includes a zero contact and in which is provided a different signal source for the zero contacts whereby the information signal occurring upon engagement between the counting contact and a zero contact is of distinctive character.

9. Apparatus as in claim 4 including two tone generators of different frequencies respectively connected to zero and integer contacts of the decimal contact groups, the counting contact being common to the generator circuits whereby the zero and integer signals are of characteristically different frequencies.

10. Apparatus as in claim 4 in which the decimal contact groups are respectively on the cylindrical surfaces of concentrically mounted drums and in which the counting contact extends from an endless loop driven always in one direction by the motor.

11. Apparatus as in claim 10 additionally including in the loop path of the counting contact a group of fixed contacts disposed and connected to produce a station identification signal.

12. Apparatus as in claim 9 additionally including in the path of the counting contact a group of fixed contacts connected in predetermined sequence to the tone-generator whereby there is produced a station identification signal of predetermined sequence of frequencies.

13. A telemetric reporting station comprising a decimal keyer having relatively movable decimal contact groups interconnected by counter mechanism and positioned by a condition-measuring device, a counting contact extending from an endless loop and movable therewith successively to engage positioned contacts of said groups, and a motor for actuating said loop always in one direction; a modulator controlled by said keyer to produce telemetric information signals for transmission to a central station, relay means in circuit with said motor, a time-switch effecting energization of said relay means at predetermined times to initiate a cycle of movement of said endless loop by said motor; and a contact member operated upon completion of a cycle of said counting contact to preclude further movement of said loop by said motor.

14. A translating device for a telemetric reporting station comprising two or more rotatable members interconnected by counter mechanism and each having contacts respectively of angular extent corresponding with the integers 1 to 9, means for coupling one of said members to a condition-measuring device for angular positioning of said members in accordance with the numerical value of the measured condition, an endless loop carrying a counting contact successively to engage contacts of each member in number corresponding with the angular position thereof, a motor for driving said loop, and control means interrupting drive of said loop by said motor upon completion of traverse by the counting contact of the contacts of said rotatable members.

15. A translating device for a telemetric reporting station comprising two or more rotatable members interconnected by counter mechanism and each having a zero contact and other contacts respectively of angular extent corresponding with the integers 1 to 9, terminals for connecting the zero contacts to one signal source, terminals for connecting the other contact to another signal source, means coupling one of said members to a condition-measuring device for angular positioning of said members in accordance with the numerical value of the measured condition, and a counting contact movable successively to engage zero and integer contacts of said members in dependence upon their angular position.

16. A translating device for a telemetric reporting station comprising two or more rotatable members interconnected by counter mechanism and each having contacts respectively of angular extents corresponding with the integers 1 to 9, means for coupling one of said members to a condition-measuring device for angular positioning of said members in accordance with the numerical value of the measured condition, a counting contact movable successively to engage contacts of each member in number corresponding with the angular position thereof, a motor for actuating said counting contact, and a brake for precluding positioning of said members by said device during actuation of said counting contact by said motor.

17. A translating device for a telemetric reporting station comprising two or more concentrically mounted drums each having peripheral contacts of angular extents corresponding with the integers 1 to 9, decimal counter mechanism interconnecting adjacent drums, means for coupling a condition-responsive device to one of said drums, a movable counting contact, and an endless loop to which said contact is secured for movement axially of said drums and along the periphery thereof for successive engagement with the drum contacts in number corresponding with the decimal value of the measured condition.

18. A translating device for a telemetric reporting station comprising two or more rotatable members interconnected by counter mechanism and each having contacts respectively of angular extent corresponding with the integers 1 to 9, means for coupling one of said members to a condition-measuring device for angularly positioning said members in accordance with the numerical value of the measured condition, an electric motor, a counting contact driven by said motor successively to engage contacts of each of said members in number corresponding with the angular position thereof, a latching relay having actuating and release windings, relay contact structure operated upon energization of said actuating winding to effect energization of the counting contact motor, a control contact engaged by said counting contact after traverse of said integer contacts to energize said release winding for movement of said relay contact structure from motor-energizing position, and a second control contact engaged by said counting contact for continued energization of said motor for a brief interval insuring movement of said counting contact beyond said first control contact.

References Cited in the file of this patent

UNITED STATES PATENTS

| | | |
|---|---|---|
| 1,444,417 | Hammond, Jr. | Feb. 6, 1923 |
| 1,673,369 | Mills | June 12, 1928 |
| 1,691,360 | Reagan | Nov. 13, 1928 |
| 1,955,043 | Yates et al. | Apr. 17, 1934 |
| 2,466,099 | Hansen | Apr. 5, 1949 |
| 2,496,585 | Harper | Feb. 7, 1950 |
| 2,522,453 | Keyes | Sept. 12, 1950 |
| 2,534,841 | Wallace | Dec. 19, 1950 |
| 2,558,888 | Trimble | July 3, 1951 |
| 2,584,739 | Rees | Feb. 5, 1952 |
| 2,591,617 | Savino | Apr. 1, 1952 |

FOREIGN PATENTS

| | | |
|---|---|---|
| 160,958 | Germany | June 14, 1905 |